June 4, 1957 R. G. OLSON 2,794,545
PAPER CUP CONSTRUCTION
Filed June 10, 1954
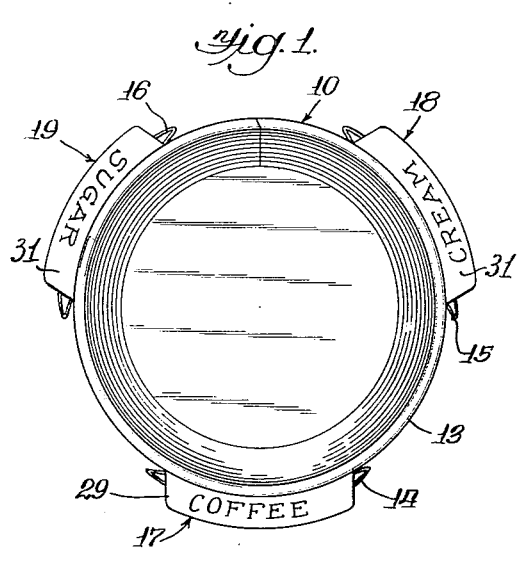
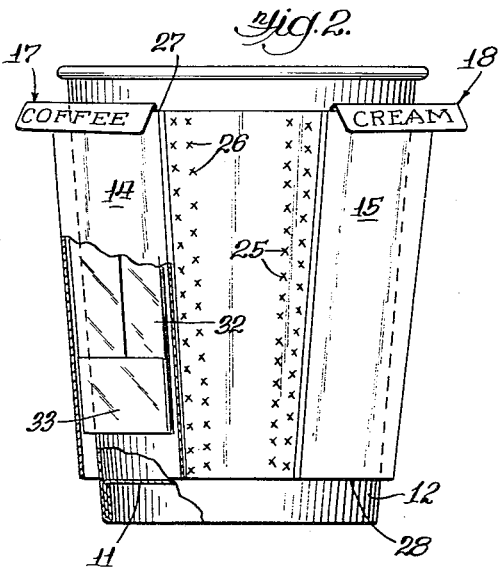
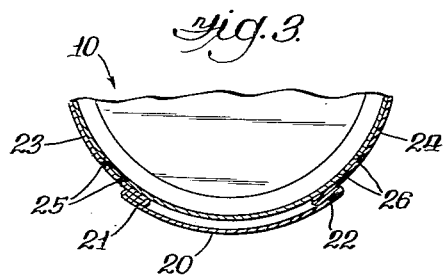
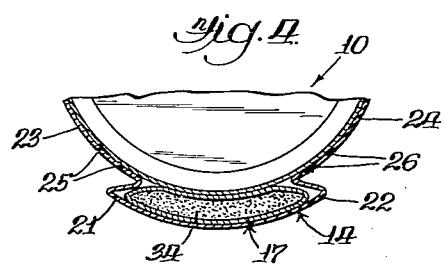
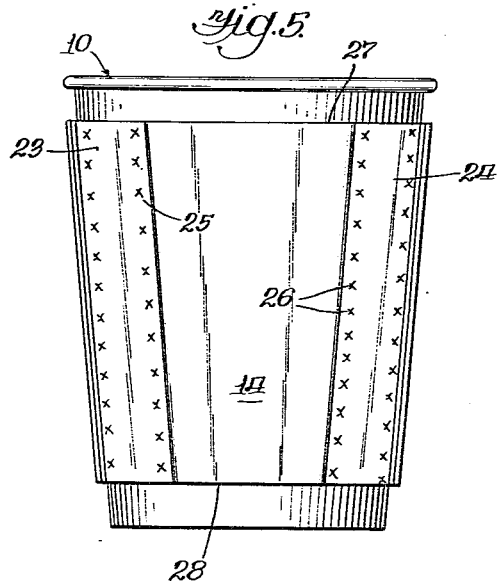
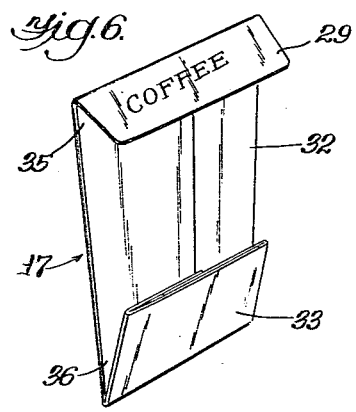
INVENTOR.
Raymond G. Olson
BY
Kenneth J. Snow
Atty.

United States Patent Office 2,794,545
Patented June 4, 1957

2,794,545

PAPER CUP CONSTRUCTION

Raymond G. Olson, Niles, Ill., assignor of one-half to Kenneth T. Snow, Oak Park, Ill.

Application June 10, 1954, Serial No. 435,728

4 Claims. (Cl. 206—47)

This invention relates to a new and improved paper cup construction.

Paper cups are now being used in the same manner as china cups. This is true whether the cup is to be used for a hot drink, such as coffee, or an iced drink. An important factor in the development or extension of use of paper cups is the successful development of instant powdered beverages. For example, an instant coffee in powdered form is available and all that is needed to produce a cup of coffee is the adding of hot water. Still further, powdered cream or milk is now available so that the use of instant coffee by persons not having kitchens or refrigerators available has been considerably extended. Thus, a user of coffee may employ instant coffee, powdered cream and/or sugar and merely by adding hot water can produce a cup of coffee which is just as real as any coffee brewed in any manner. Various forms of packages are now being marketed which include paper cups and packets of powdered instant coffee, powdered cream, and/or powdered sugar. The present invention relates to a means for packaging these various elements and simultaneously providing an efficient insulating means for a paper cup so that a user may conveniently hold the cup although the contents are boiling or are very hot.

A principal object of the present invention is to provide a paper cup having pockets formed around the periphery thereof to receive packets of powdered beverage contents.

Another important object of this invention is the provision of means in a paper cup construction for carrying packets of powdered beverages in pockets formed on the outer wall of the cup in such a manner that the pockets provide an insulation for the annular periphery of the paper cup whereby the user may have the contents of a beverage readily available and simultaneously be protected against the heat of the beverage within the cup by reason of the insulation created by the pockets.

Still another important object of this invention is to supply a hot drink paper cup with a plurality of pockets formed around the annular periphery of the cup.

Another and still further important object of this invention is to equip a hot drink paper cup with a plurality of collapsible pockets formed around the annular outer surface of the cup.

A further important object of this invention is to provide a hot drink paper cup of relatively conical shape with a packet formed vertically on the side of the paper cup and having its top and bottom opened with the top being greater in width than the bottom whereby a packet of powdered beverage contents may be inserted within the pocket from the top side and be held therein by reason of the tapering walls of the pocket.

A still further important object of this invention is the provision of means in a paper cup construction wherein a plurality of collapsible tapering pockets are formed around the annular outer surface of a tapering paper cup with the largest opening in the top of the pocket.

A still further important object of this invention is to provide a paper cup constructed with peripheral pockets acting simultaneously to insulate the user from the heat or cold of the cup contents and to hold beverage contents or supplies.

A further important object of this invention is the provision in a paper cup having external pockets formed in the outer peripheral surface for receiving a plurality of packets of powdered beverage contents with outwardly projecting tabs from the cup pockets with name indicia marked thereon so that the user may easily remove the contents from the pockets and deposit them within the paper cup.

Other and further important objects and advantages will become apparent from the disclosures in the following specification and accompanying drawings.

In the drawings:

Figure 1 is a top plan view of the pocket carrying cup of this invention.

Figure 2 is a side elevational view of the cup of Figure 1.

Figure 3 is a partial detail of a transverse sectional view taken through one of the cup's pockets when the pocket is collapsed against the side of the cup.

Figure 4 is a sectional detail identical with the showing of Figure 3 but with the cup expanded.

Figure 5 is a direct front elevational view of one of the side pockets of the cup.

Figure 6 is a perspective view of a pocket adapted to fit into and be carried by one of the cup's pockets.

As shown in the drawing:

The reference numeral 10 indicates generally a paper cup having a recessed bottom 11 and a tapering or conical side wall 12. The top opening of the paper cup 10 is circular in shape and is defined by a rolled top drinking lip 13. The paper cup as defined to this point is identical to many cups now in existence and used particularly for hot drinks such as coffee. Although the use of this cup is shown to be applicable for a coffee drink it is equally suitable for use with any hot drink or cold drink which may be made by powdered contents dissolvable by the adding of a liquid thereto.

The cup 10 is provided with spaced apart peripheral pockets 14, 15 and 16 which are disposed on the outside of the tapering or conical shaped side wall 12. The pockets 14, 15 and 16 are adapted to hold the powdered beverage contents of any drink and as shown herein a packet 17 of powdered instant coffee is shown inserted within the vertically disposed pocket 14 and similarly a packet of powdered cream 18 is in the pocket 15 and a packet of sugar 19 is in the pocket 16. As stated in the objects above it is a feature of this invention to make available to a user the powdered contents of a cup of coffee regardless of whether the user wants cream or sugar or both with his coffee. The pockets 14, 15 and 16 which are disposed around the circumferential surface of the paper cup 10 carry these packets of powdered beverage contents in such a manner that the user may conveniently remove them from the pockets and deposit the powdered contents into the cup whereafter hot water may be added to make the desired drink. Three pockets 14, 15 and 16 are shown around the periphery of the cup; however, it should be understood that any number of pockets as desired may be employed on the cup. The several pockets are preferably all made uniformly so that the packet from any one may be interchanged and deposited in any of the other pockets. The pockets are also preferably made as a unit from one piece of paper material so they may be slid up on the side of the cup as a sleeve and thereafter fixedly attached to the cup.

In order to show the details of the pocket construction, a section has been taken through one of the pockets as shown in Figure 3 and inasmuch as the pockets are identical only one is shown in detail and it should be understood that all of the pockets are just the same. The pocket as shown in Figure 3 is collapsed against the tapering, conical side wall 12 of the paper cup 10 so that the cups of this invention may be stacked in a nested manner just the same as any paper cups without the side carrying pockets 14, 15 and 16. The side wall pocket as shown in Figures 3 and 4 includes an outer wall 20 which is spaced from the side wall 12 of the paper cup to receive the packets 17, 18 and 19 carrying the powdered beverage contents. The lateral edges of the outer wall 20 are provided with "accordion" folds 21 and 22 respectively to enable the pockets to be collapsed closely against the side wall of the cup 10 or spread outwardly away from the side wall 12 of the cup in order to be large enough to receive one of the packets of powdered beverage contents. Adjacent the inside of the accordion fold 21 is a lateral side flange 23, and similarly adjacent the accordion fold 22 there is provided a side flange 24. The lateral side flanges 23 and 24 are the means for fastening the pocket packet carrier to the outer wall 12 of the paper cup 10. As previously stated the several pockets and their intermediate sections are continuous around the cup. The intermediate sections thus comprise the flanges 23 and 24. As best shown in Figures 2, 3 and 4 the pocket lateral extensions 23 and 24 are fastened by means of cement or other adhesive means such as a heat seal means to the cup wall 12 as shown at 25 and 26 respectively. For purposes of convenience and better understanding the pocket as shown in Figure 4 is designated as pocket 14 which carries the packet of coffee 17. It is thus evident that the pocket or pockets may be collapsed or extended as becomes necessary and are available at all times to carry the packets of beverage contents or the cup may be used without beverage contents in the pockets and when so used the several pockets provide adequate insulating means to protect the user from the heat or cold of the contents of the cup.

As best shown in Figure 5 the pocket 14 and similarly the pockets 15 and 16 have a relatively wide open top 27 through which the packets 17, 18 and 19 are inserted and removed. The lower end or bottoms of these pockets are relatively narrow as shown at 28 although they are open in the same manner as the tops are open. Thus the pockets taper inwardly from a wide top to a narrow bottom and it is this physical characteristic which permits the holding of packets or other material without the necessity of a bottom. Inasmuch as there is no bottom or top to the side pockets, the collapsing and extending of the pockets is made relatively easy as shown in Figures 3 and 4. Each of the beverage content packets 17, 18 and 19 is provided with folded pull tabs 29, 30 and 31 respectively. The pull tab 29 for the coffee packet 17 is shown in greater detail in the perspective view detail of the packet 17 in Figure 6. The pull tabs 29, 30 and 31 are folded outwardly away from the cup in order to provide hand engaging means for each of the packets when the packets are inserted within the cup pockets 14, 15 and 16.

As previously stated the coffee packet 17 is shown in greater detail in Figure 6. The packet comprises a paper folded body 32 having its lower end folded upwardly at 33 to provide a bottom for the powdered contents. As shown in Figure 4 the packet 17 contains powdered coffee 34. The paper folded packet 17 as shown in Figure 6 conforms generally to the tapering shape of the pockets placed around the periphery of the paper cup 10. In other words the top of the packet 17 is relatively wide as shown at 35 and the bottom 36 is somewhat narrower in order that the packet may conveniently slide into the pockets 14, 15 and 16 on the outside of the cup. However, the width 36 of the bottom of the paper packet is somewhat wider than the narrow lower end 28 of the pocket 14 so that when the packet is inserted through the wide top opening 27 of the pocket it will not be permitted to slide entirely through the pocket but rather will be retained within the pocket in substantially fully telescoped position therein. The tab top 29 of the packet extends outwardly over the top 27 of the pocket so that a user may conveniently grip the tab to pull the packet from its position within the pocket.

In operation or use, a cup of this invention is provided with the coffee, cream and sugar packets within the spaced apart pockets 14, 15 and 16 on the outer annular cup wall. Let us assume that it is desired to make a cup of hot coffee. The coffee packet 17 is removed from the pocket 14 by pulling upwardly on the tab 29. The contents of the packet 17 are easily removed by unfolding the bottom 33 of the packet downwardly in a position over the cup 10 and permitting the contents 34 which is the powdered coffee to drop downwardly from the bottom into the cup. Similarly, if cream and sugar are desired the tabs 30 and 31 of the packets 18 and 19 are pulled upwardly and the contents removed in the same manner as for the coffee so that the cup 10 now contains the entire ingredients for a cup of coffee with cream and sugar minus the liquid. At this point hot water is added to the cup and the contents stirred to complete the coffee making. Obviously the cream and/or sugar need only be added if the user desires these substances in his coffee.

It is believed that herein is provided a novel paper cup with packet carrying pockets built on the side of the cup in such a manner that the pockets may collapse against the outer side of the cup or be extended to receive and dispense paper packets of beverage contents for easy and ready depositing thereof within the cup in order to make a coffee drink. In addition to the convenience and ease of access of the beverage contents on this cup it should be remembered that the cup is capable of nesting with other similar cups with or without the powdered beverage contents packets reposing within the pockets. Still further it should be remembered that the pockets provide insulating means to permit the user to make very hot coffee or, for example, hot cocoa and yet immediately hold the cup without fear of burning his hand by reason of the outward spacing of the pockets 14, 15 and 16 providing very efficient insulating means from the contents of the cup to the user's hands.

I am aware that various details of construction may be varied throughout a wide range without departing from the principles disclosed herein and I therefore do not propose limiting the patent granted hereon otherwise than as necessitated by the appended claims.

What is claimed is:

1. A paper cup construction comprising a conical shaped cup of circular cross section, said conical shaped cup having its greater diameter at the top thereof, means forming a plurality of pockets on the outer surface of said conical shaped cup, said means including a separate band of paper having extended portions coinciding with the circular cross section of the cup engaging and cemented to the outer surface of said conical shaped cup and the portions of said separate band of paper intermediate the said extending portions constituting pockets.

2. A paper cup construction comprising a conical shaped cup of circular cross section, said conical shaped cup having its greater diameter at the top thereof, means forming a plurality of pockets on the outer surface of said conical shaped cup, said means including a separate band of paper intermittently cemented to the outer surface of said conical shaped cup and the portions intermediate the intermittent cementing constituting pockets, said separate band of paper adjacent each such cementing having accordion folds whereby intermediate pockets may have expansion.

3. A device as set forth in claim 2 wherein the pockets taper inwardly from top to bottom.

4. A device as set forth in claim 3 in which tapering packets are inserted into the pockets, and each packet having a pull tab at the top thereof whereby a name may be applied thereto to identify the contents of the packet.

References Cited in the file of this patent
UNITED STATES PATENTS

| | | |
|---|---|---|
| 1,336,092 | Schenkelberger | Apr. 6, 1920 |
| 1,785,498 | Savageau | Dec. 16, 1930 |
| 2,646,200 | Atkins | July 21, 1953 |
| 2,661,889 | Phinney | Dec. 8, 1953 |